Figure 1:
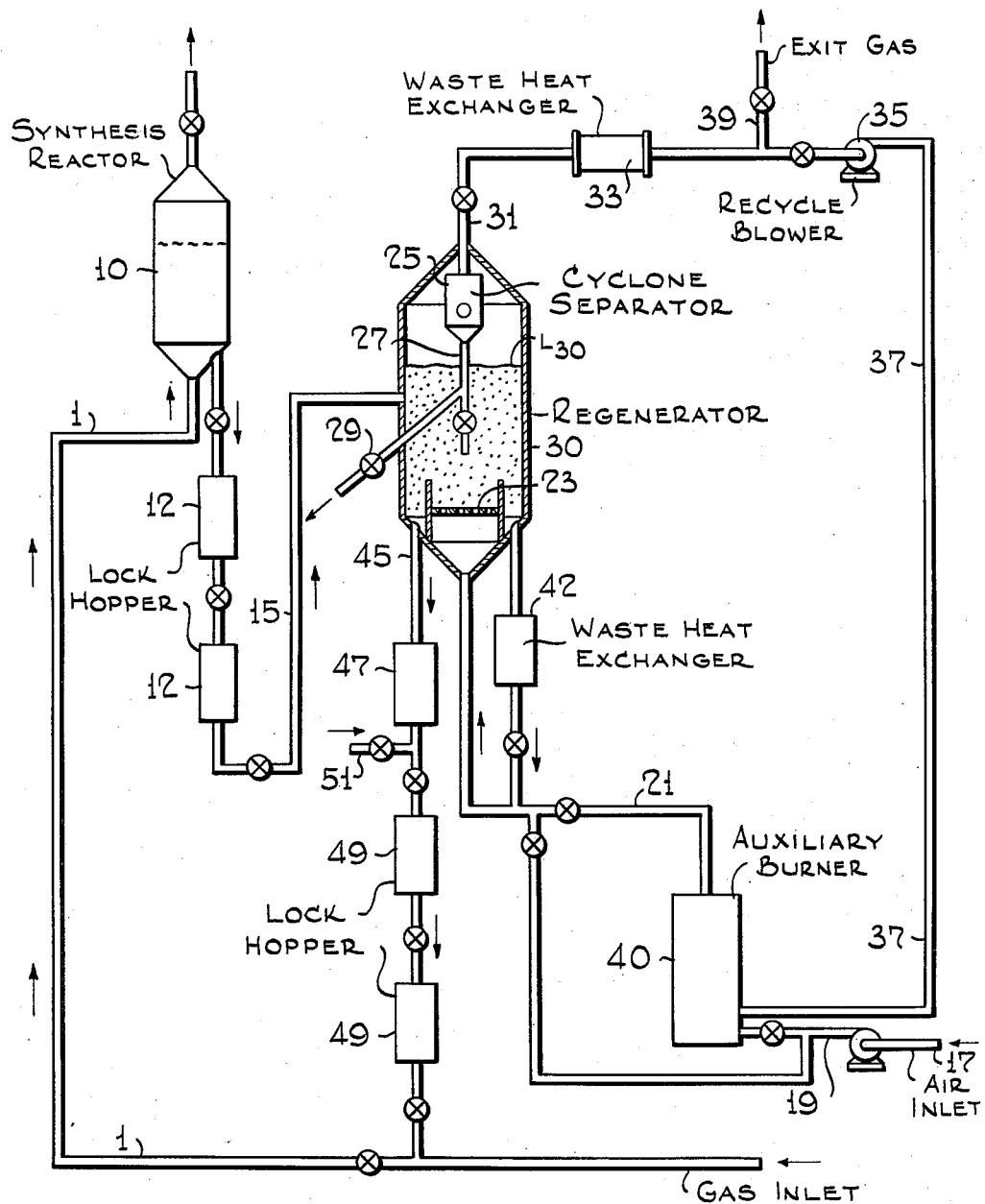
Figure 2:
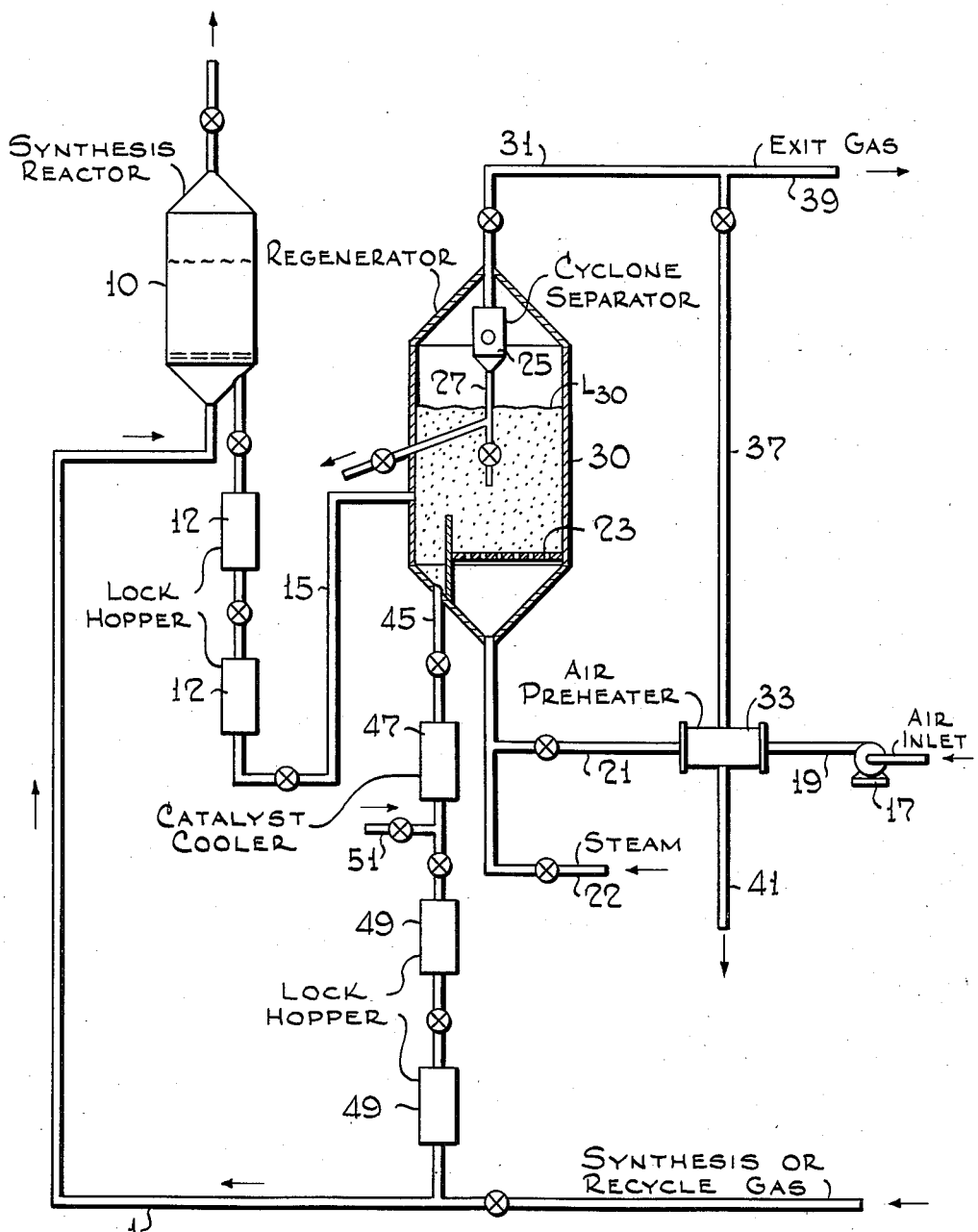
Figure 3:
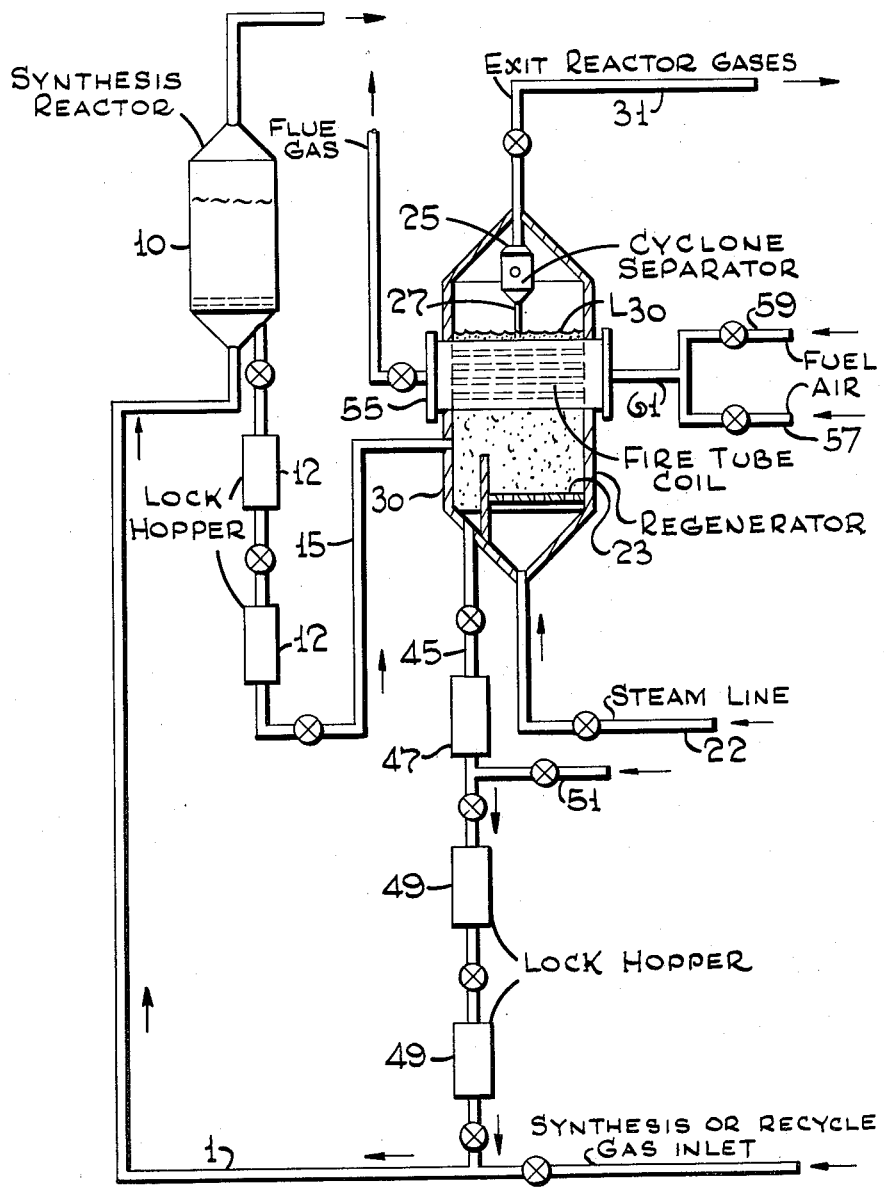

Patented July 31, 1951

2,562,804

UNITED STATES PATENT OFFICE 2,562,804

REGENERATION OF AN IRON CATALYST WITH CONTROLLED CO$_2$:CO RATIOS

Homer Z. Martin, Roselle, and Ivan Mayer and Charles W. Tyson, Summit, N. J., assignors to Standard Oil Development Company, a corporation of Delaware Application November 28, 1947, Serial No. 788,538

9 Claims. (Cl. 252—417)

This invention relates to the catalytic conversion of carbon oxides with hydrogen to form valuable synthetic products. The invention is more particularly concerned with an improved method of employing and reconditioning finely divided catalysts having a high activity and selectivity for the formation of normally liquid hydrocarbons in the catalytic conversion of carbon monoxide with hydrogen employing the so-called fluid solids technique.

The synthetic production of liquid hydrocarbons from gas mixtures containing various proportions of carbon monoxide and hydrogen is already known and numerous catalysts, usually containing an iron group metal, have been described which are specifically active in promoting the desired reactions at certain preferred operating conditions. For example, cobalt supported on an inert carrier is used when relatively low pressures (atmospheric to about 5 atmospheres) and low temperatures (about 375°–425° F.) are applied in the manufacture of a substantially saturated hydrocarbon product while at the higher temperatures (about 450°–750° F.) and higher pressures (about 5–25 atmospheres and higher) required for the production of unsaturated and branched-chain products of high anti-knock value, iron-type catalysts are more suitable.

In both cases, the reaction is strongly exothermic and the utility of the catalyst declines steadily in the course of the reaction due in part at least to the deposition of non-volatile conversion products such as carbon, paraffin wax, and the like, on the catalyst.

The extremely exothermic character and high temperature sensitivity of the synthesis reaction and the relatively rapid catalyst deactivation have led, in recent years, to the application of the so-called fluid solids technique wherein the synthesis gas is contacted with a turbulent bed of finely divided catalyst fluidized by the gaseous reactants and products. This technique permits continuous catalyst replacement and greatly improved heat dissipation and temperature control.

However, the adaptation of the hydrocarbon synthesis to the fluid solids technique has encountered serious difficulties, particularly with respect to catalyst deposits and their detrimental effects on the fluidization characteristics and mechanical strength of the catalyst.

As stated above, one of the most important modifications of the hydrocarbon synthesis requires the use of iron-type catalysts. These catalysts are the outstanding representatives of a group of catalysts which combine a high synthesizing activity and selectivity toward normally liquid products with a strong tendency to carbonize during the synthesis reaction, that is, to form fixed carbon or coke-like catalyst deposits which cannot be readily removed by conventional methods of synthesis catalyst regeneration such as extraction, reduction, or the like.

These carbon deposits, when allowed to accumulate, weaken the catalyst structure which leads to rapid catalyst disintegration, particularly in fluid operation. The reduction of the true density of the catalyst resulting from its high content of low-density carbon coupled with the rapid distintegration of the catalyst particles causes the fluidized catalyst bed to expand, thereby reducing its concentration of catalyst and ultimately resulting in the loss of the catalyst bed because it becomes impossible to hold the catalyst in a dense phase at otherwise similar fluidization conditions. With these changes in fluid bed characteristics, the heat transfer from and throughout the bed decreases markedly, favoring further carbonization and accelerating the deterioration of the fluidity characteristics of the bed.

Prior to the present invention, it has been suggested to reduce the carbon content of the catalyst of this type by withdrawing the carbonized material from the synthesis reactor and subjecting it either to a destructive hydrogenation treatment or to a combustion treatment with free oxygen-containing gases to remove carbon either in the form of volatile hydrogenation products or of carbon oxides. These treatments have various disadvantages. Destructive hydrogenation requires large amounts of expensive high pressure hydrogen. Removal of the carbon by combustion with free oxygen-containing gases may either excessively oxidize the catalyst or lead to undesired physical changes, such as agglomeration due to sintering, etc. Also, the combustion temperatures and oxygen requirements are usually excessive if substantially complete carbon removal is desired.

The present invention overcomes the aforementioned difficulties and affords various additional advantages. These advantages, the nature of the invention and the manner in which it is carried out will be fully understood from the following description thereof read with reference to the accompanying drawings.

In accordance with the present invention, catalyst carbonized in the synthesis of hydrocarbons from CO and H$_2$ is subjected to an oxidizing treatment with an oxidizing gas at conditions permitting substantially complete removal of the carbonaceous deposit without undesirable effects on the active catalyst component, particularly iron. It has been found that it is possible to effect the oxidation of coke with such oxidizing gases as air, oxygen, steam, carbon dioxide or mixtures of these gases, without oxidizing the iron or even with an appreciable reduction of any iron oxide present in the catalyst.

The invention is based on the discovery that the ultimate state of oxidation of the iron, coke and hydrogen present in the system may be controlled by a suitable control of pressure, temperature and rate and composition of the oxidizing gas. The system may be operated at pressures ranging from close to vacuum to 100 atmospheres or more and temperatures varying from about 800°–2000° F., provided temperatures, pressures and gas feed are properly correlated. However, relatively low pressures of, say, about atmospheric and high temperatures of above about 1300° F. generally favor the desired reactions.

The reactions encountered in this process may be summarized briefly as follows:

$$C + O_2 = CO_2 \quad (1)$$
$$2C + O_2 = 2CO \quad (2)$$
$$FeO + H_2 = Fe + H_2O \quad (3)$$
$$H_2O + C = CO + H_2 \quad (4)$$
$$CO + H_2O = CO_2 + H_2 \quad (5)$$
$$CO_2 + C = 2CO \quad (6)$$
$$\tfrac{1}{4}Fe_3O_4 + H_2 = \tfrac{3}{4}Fe + H_2O \quad (7)$$

At any given temperature and pressure of the system, the ultimate results obtained depend on the total pressure of the carbon oxides and the ratio of partial pressures of carbon dioxide and carbon monoxide present. Whether or not the iron is left unaffected, oxidized, or reduced depends on the partial pressure ratio $CO_2/CO$ or $H_2O/H_2$ within the reacting atmosphere. The fluid technique results in the gas composition throughout the reactor tending to be essentially the same as the exit gas composition. There are different ratios of $CO_2/CO$ or $H_2O/H_2$ at which the state of the iron will not be affected. These ratios are slightly dependent on the temperature but independent of the pressure of the operation. There also exists a certain ratio of carbon dioxide to carbon monoxide partial pressures above which carbon will be oxidized by the gas phase or below which carbon will be deposited from the gas phase. The ratio is dependent on both temperature and carbon oxides partial pressure. Thus, at a given temperature and $CO_2/CO$ ratio, a decrease in the sum of partial pressures of the carbon oxides allows for easier oxidation of carbon and vice versa. For a definite temperature and $CO_2/CO$ ratio there exists a definite partial pressure of carbon monoxide above which carbon will be deposited and below which carbon will be oxidized.

The present invention is based on the discovery of the practical conditions which will permit the treatment of the coked iron catalyst with an oxidizing gas so as to remove the coke deposit but leave the iron unchanged, or even so as to reduce the iron. In effect, the process of the invention consists in an oxidation of the carbonaceous deposit with a predetermined quantity of oxidizing gas under these conditions of temperature and pressure so that the flue gas formed will not burn iron.

The following tabulation shows the partial pressures of carbon monoxide plus carbon dioxide below which our process can be made to operate at different temperatures.

| Temperature, °F | 1100 | 1200 | 1300 | 1472 |
|---|---|---|---|---|
| $P_{CO} + P_{CO_2}$, Atm | 0.132 | 0.42 | 1.32 | 6.14 |
| $P_{CO_2}/P_{CO}$ | 0.84 | 0.74 | 0.65 | 0.52 |
| Minimum $P_{CO_2}/P_{CO}$ | 0.50 | 0.44 | 0.36 | 0.30 |
| Oxide Type | FeO | FeO | FeO | FeO |

At these conditions, the ratio $P_{CO_2}/P_{CO}$ is such that the gas phase is just in equilibrium with solid carbon and also with both Fe and FeO. Practical operation will preferably be conducted at a pressure sufficiently low so that the value of $P_{CO} + P_{CO_2}$ is lower than indicated for the respective regeneration temperature given in the above tabulation. Under these conditions, the ratio $P_{CO_2}/P_{CO}$ may be taken from the tabulation at the temperature chosen for operation in which case the iron oxide will remain unaltered but the carbon will tend to be removed. A lower ratio may be chosen in which case some iron will be reduced. The ratio, however, should not be lower than required for coke oxidation. The minimum ratios which must be exceeded for coke oxidation at an operating pressure such that $P_{CO} + P_{CO_2}$ is, for example, ½ the value indicated are likewise given in the above tabulation.

The ratio of $P_{CO_2}/P_{CO}$ and the value of $P_{CO} + P_{CO_2}$ attained, are functions of the relative rates of oxidizing gas to coke and the operation of the process is dependent on proper control of these rates. Perfect control is not necessary, since considerable latitude is possible while still maintaining the desired conditions. For example, if at 1472° F. the combined carbon oxides partial pressure is maintained at 6.14 atmospheres in the reactor outlet, no reaction will occur on either the iron or coke in the system providing the $CO_2/CO$ ratio is held at 0.52. However, if at this temperature the combined carbon oxides partial pressure is reduced to 1 atmosphere and the $CO_2/CO$ ratio is maintained at 0.52, the iron will not be affected while the coke will be oxidized. In other words, at 1 atmosphere partial pressure of the combined carbon oxides, if the $CO_2/CO$ ratio is permitted to go below 0.52 the iron will be reduced while coke will continue to be oxidized unless the $CO_2/CO$ ratio drops to 0.12 at which point no change will occur in the coke. However, if the $CO_2/CO$ ratio is permitted to fall below 0.12, coke will tend to be deposited. At 1472° F., if the combined carbon oxides partial pressure is allowed to rise above 6.14 atmospheres and if the ratio of $CO_2/CO$ is permitted to rise above 0.52 both the coke and the iron will tend to change to the oxidized state.

Broadly, these relationships may be expressed by the following equations:

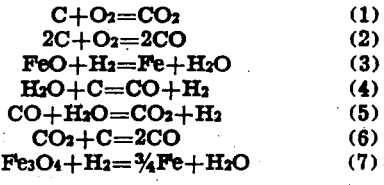

$$r = 10^{\left[-1.170 + \frac{1730}{t+460}\right]} \quad (1)$$

$$r = -\tfrac{1}{2} + \tfrac{1}{2}\sqrt{1 + \frac{4s}{10^{9.25 - \frac{16170}{t+460}}}} \quad (2)$$

wherein $r$ is the ratio of the partial pressure of $CO_2$ to that of $CO$, $s$ is the sum of these partial pressures in atmospheres and $t$ is the temperature of operation in °F. For operation excluding an oxidation of iron during carbon removal, the value of $r$ should be equal to or less than that given by Equation 1 but greater than that defined by Equation 2. In using Equation 2, the temperature $t$ and the sum $s$ must be selected and any value of $s$ which results in a value of $r$ from Equation 2, lower than the value of $r$ resulting from Equation 1, is satisfactory.

It may be desirable to reduce the oxygen content of the iron catalyst without affecting its carbon content or even with an accompanying increase of its carbon content in the form of free carbon. In these instances, $r$ should be equal to or lower than the value defined by Equation 2. Problems like this may occur in connection with synthesis reactions wherein little or no carbon is formed in the synthesis stage. In order to oxidize the iron without burning carbon, the value of $r$ must be greater than that given by Equation 1 and the value of $s$ must be at least equal to that given by Equation 2 for a value of $r$ greater than that given by Equation 1.

Similar results may be obtained when using steam as the oxidizing gas in place of free oxygen or carbon dioxide. Instead of using the combined partial pressures of carbon oxides and the ratio of carbon dioxide to carbon monoxide as the factors controlling the oxidation conditions, the reaction with steam may be governed in the direction of carbon removal without iron oxidation by controlling the steam quantity so as to establish the proper $H_2O/H_2$ ratio and the proper partial pressure ratio $$\frac{P_{CO} \times P_{H_2}}{P_{H_2O}}$$

in the system. In this reaction, carbon oxides will likewise be present in the gas phase and the relationships outlined above also hold in the case of using steam as the oxidizing gas.

A particular advantage in using steam instead of free oxygen in the form of air is the fact that the exit reactor gases are suitable for use in the hydrocarbon synthesis process since they do not contain nitrogen which would be present had air been used as the oxidizing agent.

Free oxygen, carbon dioxide and steam have been treated above as oxidizing gases substantially equivalent for the purposes of the invention. While this is true as far as the reaction mechanism is concerned which determines the degree of oxidation in the iron-iron oxide-carbon-carbon oxides-hydrogen-steam system, the heat effects of the reactions involved are basically different. The oxidation with free oxygen is strongly exothermic, those with carbon dioxide and steam are endothermic. Oxidation with free oxygen in the form of air, mixtures of air with oxygen, or pure oxygen, requires, therefore, the provision of suitable heat withdrawal means which may have the form of conventional cooling equipment or of a preferably continuous solids cycle from the combustion zone through a cooling zone back to the combustion zone. Oxidation with steam or carbon dioxide, on the other hand, demands the addition of heat which may be accomplished by installing a firetube heating coil, or the like within the reactor so that the reaction may be carried out at any desired temperature.

However, it has been further found that the process of the invention may be carried out substantially adiabatically when suitable mixtures of air and/or oxygen, steam and/or carbon dioxide are used as oxidizing gases under properly controlled conditions.

For example, it is possible to control both temperature and selectivity of coke oxidation and/or iron oxidation by the use of proper mixtures of air and steam. The ratio of air to steam required depends on the temperature and pressure of the operation as well as the composition of the coke to be burned in order adiabatically to control the process. However, it may be stated that the decarbonization of an iron catalyst containing in the neighborhood of 15% of carbon and 1% of $H_2$, without affecting the state of oxidation of the iron, may require about 0.03 lb. mols of air and about 0.01 lb. mols of steam for each pound of catalyst to be regenerated. The temperature in this modification of the process may conveniently be controlled by regulating air preheat, which is most readily accomplished by heat exchange of the air with the exit regenerator gases. The presence of steam, in addition to making the operation adiabatic, has the further advantage of diluting the carbon oxides in the system whereby it is possible to operate the system at higher total pressure at a given temperature than without the steam addition, since the partial pressure of carbon oxides is reduced.

Adiabatic operation of the process may also be accomplished when using carbon dioxide as the principal oxidizing gas, by the addition of free oxygen, for instance in the form of air, to the system in quantities that depend on the quantity and composition of the coke to be removed, in a manner similar to that outlined in connection with the use of steam.

Instead of adding air alone to the steam oxidation system, mixtures of free oxygen, such as air, with gaseous or liquid hydrocarbons or hydrogen may be used in proportions adequate to balance the heat requirements of the system, by the exothermic combustion of the hydrocarbons or hydrogen with the free oxygen added. This modification is particularly beneficial when there is insufficient coke on the carbonized catalyst to supply the required heat for maintaining the desired reactor temperature. Suitable proportions are, for example, 8200 lbs./hr. of iron, 11.2% of coke on iron, the coke containing 94.5% C. and 5.5% $H_2$, a temperature of 1400° F., a maximum pressure of 140 p. s. i. a. and a supply of 26 lb. mols/hr. of $CH_4$, 52 lb. mols/hr. of $O_2$, and 81.9 lb. mols/hr. of steam.

A similar procedure may be followed when carbon dioxide is used as the principal oxidizing gas. Thus, it has been found that by charging a mixture of methane and free oxygen containing gas, such as air, to the steam oxidation system either internally or externally from the coke-burning reactor it is possible to operate the system adiabatically. In all cases, there will be a definite ratio of carbon dioxide, free oxygen and hydrocarbon required for adiabatic decarbonization, depending on the type of hydrocarbon used, the amount and composition of the coke to be burned and the temperature and pressure of the operation.

Instead of using a hydrocarbon as described above, hydrogen may be added to the system to render the operation adiabatic. It has been found that this may be accomplished by charging a mixture of hydrogen and oxygen in a ratio of about 2:1 along with the steam. The amount of hydrogen required for this type of operation again depends on the temperature and pressure of the operation as well as the composition and quantity of the coke to be burned. In general, the oxygen is fed in a ratio such that it supplies the heat requirement of the system and has the same effect on the system as the steam which it replaces. By way of example, operating conditions suitable for this embodiment of the invention may be given as follows: 8200 lbs./hr. of catalyst expressed as iron, 11.2% of coke on iron, the coke containing 94.5% C and 5.5% $H_2$, temperature 1400° F., maximum pressure 189 p. s. i. a., supply of about 85.9 lb. mols/hr. of steam, 71.8 lb. mols/hr. of $H_2$ and 36 lb. mols/hr. of $O_2$.

It has been shown above that for every temperature there is a definite combined carbon oxides partial pressure above which, and a definite $CO_2/CO$ ratio below which it is not possible to oxidize coke. Now, it has been further found that the process may be operated at any pressure desired for any given temperature when an inert gas, such as nitrogen, is added to the system in suitable amounts. In this manner, the total pressure of the system may be raised without affecting the ratio and relative partial pressures of the carbon oxides. By the same means it becomes possible to operate at lower temperatures, if it is desired to operate at a definite pressure. For example, when using pure oxygen, the maximum pressure may be, say, about 80 p. s. i. a. to produce 100 mols of inert-free outlet gas. By adding 100 mols of inerts such as nitrogen to the gas feed, the process may be operated at a maximum pressure of 160 p. s. i. a. Thus, in this case, the maximum allowable pressure is doubled by a dilution of the active gas constituents with an equivalent quantity of inerts.

It will be readily understood that this modification of the invention has significant advantages since it facilitates operation of the catalyst regeneration system at the pressure of the synthesis process and at temperatures more closely approaching those of the synthesis process.

Having set forth its objects and general nature, the invention will be best understood from the more detailed description hereinafter in which reference will be made to the accompanying drawings wherein:

Figure I is a semi-diagrammatical view of a system suitable for carrying out the regeneration of iron-type synthesis catalyst in an exothermic or endothermic reaction in accordance with the present invention;

Figure II is a similar illustration of a system suitable for the regeneration of the same catalyst in an adiabatic operation; while Figure III illustrates the case of indirect heat supply to the system.

Referring now in detail to Figure I, the system illustrated therein essentially comprises a synthesis reactor 10 and a catalyst regenerator 30, whose functions and cooperation will be forthwith explained.

In operation, synthesis reactor 10 contains a dense, turbulent, fluidized mass of iron catalyst such as sintered pyrites ash promoted with about 1.5% of potassium carbonate. Synthesis feed gas containing about 0.8–3.0 volumes of $H_2$ per volume of CO is supplied from line 1 to reactor 10 at a suitable synthesis pressure of 5–50 atmospheres, preferably 20–40 atmospheres. The synthesis temperature may be maintained between the approximate limits of 500°–800° F., preferably between about 550° and 700° F. by conventional methods of heat removal (not shown). Details of the operation of fluid synthesis reactors using iron catalyst are well known and need not be further specified here.

As stated before, carbon deposits form on the catalyst in reactor 10 and in about 100 hours as much as 50 lbs. of carbon may be deposited on each 100 lbs. of catalyst. This will tend to diminish the activity of the catalyst and also cause its physical disintegration so that fines in excessive quantities will be formed. If this condition is not corrected, the density of the catalyst phase will drop rapidly and the entire catalyst will be eventually blown out of reactor 10. The present invention corrects this difficulty by subjecting the carbonized catalyst to a continuous regeneration in regenerator 30 at the conditions of the invention as will appear more clearly hereinafter.

By way of example, it is assumed that 8200 lbs. per hour of catalyst (expressed as weight of pure iron) containing 11.2% coke on iron is to be regenerated without affecting the state of oxidation of the iron. The coke contains 94.5% C, 5.5% H. The carbonized catalyst is withdrawn downwardly through a system of lock hoppers 12 wherein the pressure may be reduced to atmospheric at which the catalyst may be charged through line 15 to regenerator 30 which may have a diameter of about 10–12 ft. and a height of about 25–40 ft. Air is supplied by blower 17 through lines 19 and 21 to the bottom of regenerator 30 which it enters through a distributing means, such as grid 23, at a velocity of about 0.5–5 ft. per second to regenerate and convert the catalyst within regenerator 30 into a dense fluidized mass having an upper level $L_{30}$. About 1,620 normal cu. ft. of air per minute is suitable for this purpose at the conditions indicated.

The regeneration reaction is exothermic and about 3.5 million B. t. u. per hour must be removed from the catalyst mass to maintain it at a temperature of about 1400° F. At these conditions, the combined carbon oxides partial pressures equal 0.24 atmosphere and the ratio $$\frac{P_{CO_2}}{P_{CO}}$$

equals 0.58, and the iron will leave the regenerator with the same oxygen concentration as it enters the regenerator.

However, in order to assure a non-oxidizing atmosphere with respect to iron throughout regenerator 30, it is desirable to circulate flue gas from the top of regenerator 30 to the regenerator inlet. For this purpose, the flue gas leaving level $L_{30}$ overhead may be passed through a conventional gas-solids separation system 25 which may include cyclones, precipitators and/or filters and from which separated catalyst fines may be returned through line 27 to regenerator 30, or discarded through line 29. The gas now substantially free of entrained solids may be passed through line 31 and a cooling means such as a waste heat exchanger 33 over a recycle blower 35 and line 37 back to air feed line 21. The proportion of gas recycled through line 37 preferably amounts to about 2–8 times the quantity of flue gas produced in regenerator 30. Excess flue gas may be vented through line 39.

In accordance with a preferred embodiment of the invention, the recycle gas is subjected to a partial combustion in an auxiliary burner 40 by the process air supplied through line 19. In this manner, substantially all the oxygen of the air is converted to carbon oxides outside the regenerator, which facilitates the maintenance of the desired oxidation conditions in regenerator 30 so as to avoid undesired oxidation of iron. As a result of the high flue gas recycle ratio, all of the oxygen in the air is converted into carbon oxides and water vapor while still maintaining a desirable ratio of $CO_2$:CO in the feed gas to regenerator 30. Since, in this case substantially no exothermic reaction takes place in regenerator 30 itself, no cooling of the regenerator is required, the heat needed to support the endothermic reaction in regenerator 30 being generated in burner 40 which is preferably operated at a temperature of about 1800° to 3000° F.

In this manner, the temperature of regenerator 30 may be readily controlled. In cases requiring heat removal from regenerator 30, any additional heat withdrawal means such as cooling coils or jackets (not shown) may be provided. It is preferred, however, to accomplish any necessary additional cooling by means of catalyst circulated from regenerator 30 through a cooling means such as a waste heat exchanger 42 back through line 21 to regenerator 30.

Decarbonized catalyst is withdrawn downwardly through bottom drawoff line 45 and cooler 47 to be cooled to about 400°–600° F. and to be passed via a lock hopper system 49 to synthesis gas feed line 1. The catalyst suspended in the synthesis gas is returned to synthesis reactor 10 for reuse.

The system illustrated by the drawing permits of various modifications. For example, certain iron catalysts tend to sinter under the above described decarbonization conditions, which interferes with a proper fluidization of the catalyst in regenerator 30. In these cases, regenerator 30 may have the form of a rotary kiln to which the oxidizing gas is charged. Iron oxidation may be substantially eliminated by passing solids and gases concurrently through the rotary kiln, because although iron may tend to be oxidized in the feed portion of the kiln, the gas composition in the remaining portion of the kiln is such as will reduce any iron which may have been previously oxidized. Flue gas recycle substantially as described above may be used to suppress iron oxidation in the case of either concurrent or countercurrent flow of catalyst and gases. Heat may be removed by recycling a cooled portion of the flue gases to the kiln.

The regeneration may also be carried out at elevated pressures, if desired, particularly in the presence of inert gases so that pressure reduction on the catalyst flowing from the synthesis reactor to the regenerator may be substantially minimized. For example, at the conditions specified above for the operation of the system of Figure I, pressures up to about 222 lbs. per sq. in. abs. may be used. Operation at higher temperatures permits the use of higher pressures. Either one or both of the lock hopper systems 12 and 49 may be replaced by standpipes or mechanical conveyors, if the prevailing pressure conditions permit.

As a result of the high temperatures employed in the regeneration stage, substantial proportions of the alkali metal promoter content of the catalyst may be lost. This promoter may be advantageously replaced at any point of the system after the catalyst has been completely regenerated. For example, a suitable promoter solution such as an aqueous solution of a potassium hydroxide, carbonate or halide may be injected through line 51 into catalyst withdrawal pipe 45. A conventional steam-separating zone (not shown) may then be provided above line 51. Addition of the promoter at this or a similar point rather than in the synthesis reactor is of advantage since the catalyst at this point is free of oil and coke and the promoter may thus penetrate the catalyst much more effectively than if it is added to the catalyst in the synthesis reactor.

It may also be desirable to subject the regenerated catalyst to a carbiding treatment prior to its return to the synthesis stage. This may be advantageously accomplished by contacting the regenerated catalyst, preferably after reduction, with CO-containing gases at relatively low CO-partial pressures, of preferably less than 1 atm. and temperatures of about 500°–800° F. Conditions should be so controlled that the atmosphere in contact with the catalyst is non-oxidizing with respect to iron and its carbides and that about 20–50% of the iron is converted to iron carbides.

Other modifications will appear to those skilled in the art without deviating from the spirit of the invention.

Referring now to Figure II, the system illustrated therein is similar to that of Figure I, like reference characters identifying like elements. However, the regeneration of the catalyst is carried out adiabatically in the case of Figure II, a suitable mixture of free oxygen and steam being used as the oxidizing gas.

The carbonized catalyst is transferred from fluid synthesis reactor 10 to regenerator 30 substantially as described before. Air is fed by blower 17 through line 21 and mixed with steam supplied through line 22. The air-steam mixture enters the bottom of regenerator 30 through grid 23, in suitable proportions and in amounts sufficient to maintain a regeneration temperature of about 900° to 1500° F. without the addition or withdrawal of heat and a flue gas composition permitting substantially complete coke removal without affecting the state of oxidation of the iron.

For example, when 5,660 lbs. per hour of catalyst expressed as iron containing 15.3% of carbon and 0.9% of hydrogen on iron is to be regenerated, the air required for regeneration amounts to 169.6 lb. mols per hour and the steam needed to establish the desired heat balance amounts to 53.3 lb. mols per hour.

The air may be preheated to about 200° to 1000° F. in heat exchange with flue gas flowing through lines 31 and 37 and heat exhanger 33. If desired, a portion of the flue gas from line 37 may be recycled to regenerator 30 substantially as described above. The remainder may be vented through line 41. Pressures up to about 210 lbs. per sq. in. abs. may be used at the conditions specified above. However, higher pressures may be used at higher temperatures. If the temperatures attain or exceed the sintering temperature of the catalyst, a rotary kiln may replace fluid regenerator 30 substantially as described in connection with Figure I. Return of decarbonized catalyst and promoter restoration, likewise, may take place in the manner previously described.

In the system of Figure III, steam alone is used to remove the coke in an endothermic reaction and heat must be supplied to regenerator 30. For this purpose, a bank of fire tube heating coils 55 is arranged within regenerator 30 below level $L_{30}$ of the fluidized catalyst mass therein. Steam is supplied through line 22. A combustion mixture of air and gaseous, liquid or powdered solid fuel is fed from lines 57 and 59, respectively, through line 61 to coils 55 wherein combustion takes place at a temperature of about 1500° to 3000° F. to maintain the fluidized catalyst bed at a suitable coke oxidation temperature of about 1100°–1500° F.

The amount of steam supplied is so controlled that conditions non-oxidizing with reference to iron are maintained. Suitable operating conditions may be chosen, for example, as follows: 8200 lbs./hr. of catalyst as iron, 11.2% coke on iron, the coke containing 94.5% C and 5.5% $H_2$, supply of 157.7 lb. mols./hr. of steam, temperature 1400° F., maximum pressure 189 p. s. i. a. At these conditions, about 9,000,000 B. t. u. per hour of heat must be transferred through tubes 55, which requires a supply of about 40 lb. mols./hr. of methane and 380 lb. mols of air to tubes 55 for heating.

All other steps are similar to those set forth in connection with Figures I and II, like reference characters identifying like elements. The system of Figure III may be used in a substantially analogous manner when $CO_2$ alone is employed as the oxidizing gas. When it is desired to supply heat to regenerator 30 by burning a hydrocarbon or hydrogen with free oxygen within reactor 30, suitable mixtures of air with hydrogen and/or hydrocarbons may be supplied through lines 21 and/or 22 in any of the systems illustrated in the drawing. Likewise, an inert gas such as nitrogen may be supplied through these lines whenever high pressure operation or low temperature operation at a definite pressure is desired.

If the oxygen content of the catalyst withdrawn from regenerator 30 through line 45 in any of the systems described is higher than would be desirable for an efficient operation of the hydrocarbon synthesis, the regenerated catalyst may be subjected to a reducing treatment with a reducing gas, preferably hydrogen, under conventional conditions and, if desired, at temperatures and pressures approximating those of the hydrocarbon synthesis.

It may also be desirable to carry out the hydrocarbon synthesis in a plurality of fluid type reactors through which the catalyst is passed in series to withdraw catalyst of uniformly highest carbon content rather than of average carbon concentration from the last reactor and to return regenerated catalyst to the first reactor. This method of operation, which is disclosed and claimed as such in the copending Martin and Mayer application, Serial No. 788,537, filed of even date herewith and assigned to the same interests, affords substantial savings in oxidizing gas and solids circulation rate, as shown in greater detail in said copending application.

While synthesis catalysts, such as iron-type catalyst, have been specified by way of example in the preceding description, it will be understood by those skilled in the art that the process of the invention may be applied in a substantially analogous manner to the decarbonization of other oxidizable materials which are associated with carbon, such as other metals, for example nickel, cobalt, molybdenum, manganese, chromium, noble metals, etc. or their oxides, without affecting their state of oxidation. Generally it may be stated that the process of the invention may be successfully applied to carbonized metals or their oxides which stand in about the same or a higher (nobler) position than iron, in the electromotive series. The nobler the metal the broader may be the range of operative ratios of $CO_2/CO$ partial pressures and the lower may be the operating temperatures.

While the foregoing description and exemplary operations have served to illustrate specific applications and results of the invention, other modifications obvious to those skilled in the art are within the scope of the invention. Only such limitations should be imposed on the invention as are indicated in the appended claims.

We claim:

1. A method for removing carbonaceous deposits from an iron catalyst contaminated therewith without substantially increasing the oxygen content of the iron, which comprises oxidizing the contaminated catalyst in a decarbonization zone in an atmosphere containing carbon oxides and essentially no free $O_2$ at a temperature above about 1000° F. while correlating the partial pressures of $CO_2$ and CO with the temperature in such a manner that $r$ will not be greater than that defined by the equation $$r = 10^{\left[-1.170 + \frac{1730}{t+460}\right]} \quad (1)$$

but greater than $r$ as defined by the equation $$r = -\tfrac{1}{2} + \tfrac{1}{2}\sqrt{1 + \frac{4s}{10^{9.25 - \frac{16170}{t+460}}}} \quad (2)$$

wherein $r$ is the ratio of the partial pressure of $CO_2$ to that of CO, $s$ is the sum of these partial pressures in atmospheres and $t$ is said temperature in °F.

2. The process of claim 1 in which said atmosphere comprises steam.

3. The process of claim 1 in which free oxygen and an extraneous combustible material are added to said combustion zone in amounts and proportions adequate to supply by combustion of said material the heat required by said oxidation reaction.

4. The process of claim 3 in which said material is a hydrocarbon.

5. The process of claim 3 in which said material is hydrogen.

6. The process of claim 1 in which an inert gas is added to said decarbonization zone.

7. The process of claim 1 in which gas produced in said decarbonization zone is recycled to said decarbonization in a volume ratio greater than 1 with reference to the net volume of gas leaving the decarbonization zone.

8. The process of claim 7 in which said recycle gas is partly burned prior to its return to said decarbonization zone.

9. The process of claim 1 in which a promoter is added to the decarbonized catalyst.

HOMER Z. MARTIN.
IVAN MAYER.
CHARLES W. TYSON.

REFERENCES CITED

The following references are of record in the file of this patent:

UNITED STATES PATENTS

| Number | Name | Date |
|---|---|---|
| 2,118,007 | Covert et al. | May 17, 1938 |
| 2,224,048 | Herbert | Dec. 3, 1940 |
| 2,284,603 | Belchetz et al. | May 26, 1942 |
| 2,304,183 | Layng et al. | Dec. 8, 1942 |
| 2,348,418 | Roesch et al. | May 9, 1944 |
| 2,355,831 | Voorhees | Aug. 15, 1944 |
| 2,380,391 | Bates | July 31, 1945 |
| 2,400,075 | Claussen | May 14, 1946 |
| 2,408,996 | Parker et al. | Oct. 8, 1946 |
| 2,416,003 | Guyer | Feb. 18, 1947 |
| 2,420,049 | Martin | May 6, 1947 |
| 2,420,632 | Tyson | May 13, 1947 |
| 2,452,121 | Grahame | Oct. 26, 1948 |
| 2,462,861 | Gunness | Mar. 1, 1949 |
| 2,464,532 | Sellers | Mar. 15, 1949 |